UNITED STATES PATENT OFFICE.

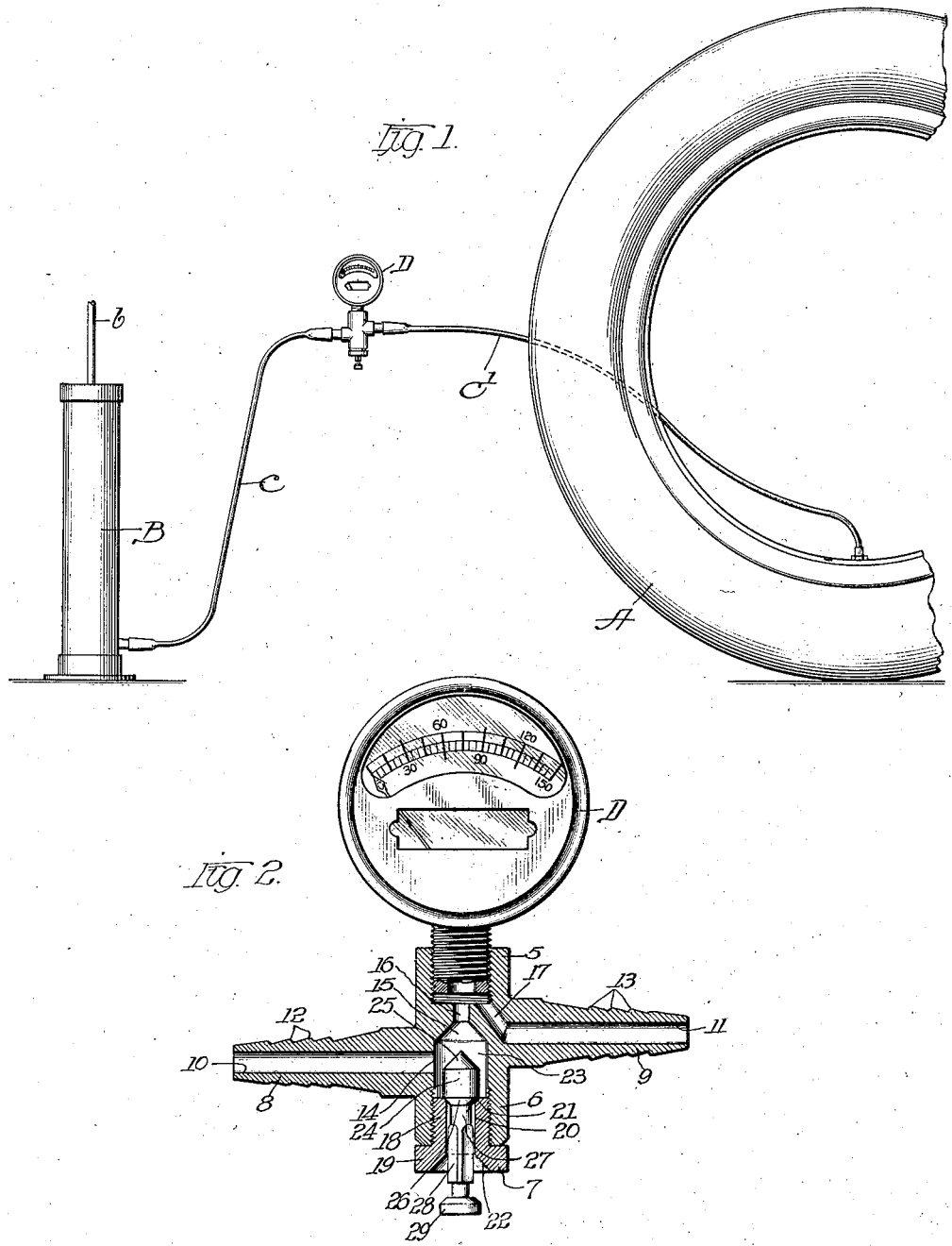

JOHN DESMOND, OF WILMETTE, ILLINOIS, ASSIGNOR TO WILLIAM S. POTWIN, OF CHICAGO, ILLINOIS.

CONTROLLING-VALVE FOR PRESSURE-GAGES.

1,102,730.   Specification of Letters Patent.   Patented July 7, 1914.

Application filed August 19, 1912. Serial No. 715,744.

*To all whom it may concern:*

Be it known that I, JOHN DESMOND, a citizen of the United States, residing at Wilmette, in the county of Cook and State of Illinois, have invented certain new and useful Improvements in Controlling-Valves for Pressure-Gages, of which the following is a specification.

My invention relates to a controlling valve for pressure gages and has for its general object to provide an attachment by the use of which increased accuracy may be attained in the reading of a pressure gage of ordinary construction.

One of the environments in which my invention is particularly applicable is in conjunction with tire-inflating apparatus, especially where the air-compressor is power driven. In such apparatus, the gage is customarily included in the piping between the air-compressing pump and the tire to be inflated, and when so applied its needle does not indicate any definite pressure but vibrates back and forth in response to direct and counter impulses of air within the piping and tire, so that no definite indication is made by the gage of the actual pressure existing at any given time within the tire during the operation of the pump. When the importance of exactness in tire inflation is considered the advantage of my valve will be appreciated, especially with power-driven pumps where the tire may easily be overinflated, for when such pumps are used the distracting vibration of the gage needle is most violent, and it is most troublesome to be required to stop the pump at intervals to allow the gage needle to settle.

My invention contemplates, therefore, the provision of a controlling valve of simple construction easily insertible with the ordinary gage in the piping between the pump and tire and so constructed that by a single and movement of a manually moved part the gage needle will immediately become stable and settle to indicate the exact pressure within the tire without necessity of stopping the pump.

In the drawing, illustrating an embodiment of my invention, Figure 1 is an elevation showing the application of the valve structure in the piping between a tire and an air-compressing pump; and Fig. 2 is a vertical central section through the device, with the gage (in elevation) carried thereby.

In said drawing, A indicates a tire to be inflated, between which and an air-compressing pump B, the piping is connected in usual fashion, such piping being in two sections, C and C', for connection therebetween of my device. The piston rod *b* of the pump, of course, may have associated therewith the usual pump-operating means (not shown).

My device, the essential and novel features of which will become apparent to those skilled in the art from the following description of one advantageous embodiment thereof and from the appended claims, includes a main structure of generally cruciform shape, one arm 5 of which has a screw-threaded bore for supporting engagement of the gage D, the opposite arm 6 of which has a threaded bore for receipt of a valve-carrying part 7 to be hereafter specifically described, and the other two arms 8 and 9 of which are centrally bored as at 10 and 11 and exteriorly ribbed as at 12 and 13 for engagement of the piping sections C and C'. The bore of arm 6 is extended inwardly, past a point of communication with the bore 10, as at 14, and terminates in a tapering valve seat 15, the center of which communicates through a port 16 with the bore in arm 5 heretofore mentioned. Between said bore in arm 5 and the bore 11 in arm 9, extends a duct 17. Thus, it will be seen, that there is provided by the structure described independent passageways from the gage respectively to the pump and to the tire, the passageway to the pump including a port with which is associated a valve seat, and that when said port is open, as shown in Fig. 2, communication may be had from the pump both to the gage and to the tire.

The valve-carrying member 7, secured in the threaded bore of arm 6 as heretofore described, comprises the exteriorly threaded portion 18 and the head 19, so that said member 7 may be screwed into the arm 6 until the head 19 contacts with the end of said arm as shown to provide an air tight fit. Said member 7 is bored as at 20, and at the upper end of said bore I provide a flaring valve seat 21. The lower end of said bore also flares outwardly to accommodate the handle of a valve member to be described.

It will now be seen that the space 23, formed by the extended bore of arm 6, has at its ends opposing valve seats 15 and 21 and in its side a communication 14—10 with the pump. Within said space 23 I provide a valve member 24 having at its ends tapering portions 25 and 26 corresponding with the valve seats 15 and 21, so that in uppermost position said valve member closes the port 16 and in lowermost normal position it closes the bore 20 which would otherwise be open to the exterior atmosphere.

As a guide and to provide a manually operable means for moving said valve member 24, I provide a stem 27, a portion whereof is squared as at 28 for guiding engagement in the bore without obstructing the passage of air therethrough, and at the end of said stem I provide a push button 29, so shaped and arranged on the stem that it does not meet the flaring portion 22 of the arm 6 when it is pushed as far inwardly as the abutment of the tapering end 25 of the valve against the seat 15 will permit, and communication is therefore afforded from the pump past valve portion 26 and seat 21, if not closed, around the stem 27—28, and between the push button 29 and flaring portion 22 of arm 6, for escape to the exterior. It will be understood that this passage is opened at 26—21 when the duct 16 is closed at 15—25.

In the use of my device, assuming it to be applied as shown in Fig. 1, the pump B started in operation, and valve member 24 seated at 21, as shown in the figure, by the influence of gravity, and held more firmly seated by the increased pressure thereabove due to operation of the pump, air will be pumped into the tire by passage B, C, 10, 14, 23, 16, 17, 11, C', the gage D communicating with said passage and therefore operating in usual fashion, that is, vibrating back and forth continuously, the vibrations being in some degree dependent upon the relative force of the pump and rapidity of its strokes, but in no event remaining stationary to indicate any particular pressure which may be taken as that existing within the tire at any particular moment. Now if it is desired to ascertain the exact pressure attained in the tire, all that is necessary is to push button 29 inwardly to close duct 16 and open bore 20 as above explained, when the gage, communicating with the quiescent air within the tire through passage 17, 11, C', will become stationary in a position which will indicate the exact pressure within the tire at the time. In the meantime the pump need not be stopped since the closing of duct 16 at 15—25 opens the bore 20 at 26—21 for escape of the air which is pumped into the space 23. The reading having been made, the finger may be removed from the button 29 when the pressure within duct 16, together with the influence of gravity, will cause it to fall again to the position shown in Fig. 2, with bore 20 closed for further inflation of the tire by the continuously operating pump.

It will be observed that the device is such that the gage operates in usual fashion when the button is in lowermost position, so that the pressure conditions in the tire may be generally watched by observation of such ordinary operation of the gage, and when the vibrations of the needle indicate that the pressure may be nearing the desired pressure to be attained, the button may be operated to ascertain the exact pressure. Thus, absolute precision in the reading may be attained with an ordinary gage when applied in the piping in coöperation with my device.

While I have herein described, and may hereafter claim for its particular advantage, one embodiment of my invention, it will be apparent that changes may be made therein without departing from the spirit of the invention and within the scope of the claims.

What I claim is:

1. A controlling valve for pressure gages to be interposed between a compressor and air receiver, comprising a casing, having an interior chamber, formed with a valve seat at each end thereof; a movable valve member, within the chamber adapted to seat on either one of the two valve seats; a duct, leading from the said chamber and adapted to communicate with the air compressor; a duct, leading from the center of each of the valve seats; a valve stem, extending through one of the last mentioned ducts, and having a cross sectional area less than that of the duct, the other duct communicating with a recess in the casing; a pressure indicating device connected to the said recess and a duct, adapted to communicate with the air receiver and extending into the recess to which the pressure indicating device is connected.

2. A controlling valve for pressure gages to be interposed between a compressor and air receiver, comprising a casing having an interior chamber formed with a conical valve seat at each end thereof; a movable valve member cone shaped at each end, within the chamber adapted to seat on either one of the two valve seats; a duct, leading from the said chamber and adapted to communicate with the air compressor, a duct, leading from the center of each of the valve seats; a longitudinally ribbed valve stem, extending through one of the last mentioned ducts and having a cross sectional area less than that of the duct, the other duct communicating with a recess in the casing; a pressure indicating device connected to the said recess and a duct, adapted to communicate with the air receiver and extending into the recess to which the pressure indicating device is connected.

In testimony whereof I hereunto set my hand in the presence of two witnesses.

JOHN DESMOND.

In the presence of—
 FORÉE BAIN,
 MARY F. ALLEN.